(12) United States Patent  
Fossum et al.

(10) Patent No.: US 8,040,394 B2  
(45) Date of Patent: *Oct. 18, 2011

(54) DIGITAL EXPOSURE CIRCUIT FOR AN IMAGE SENSOR

(75) Inventors: Eric R. Fossum, La Crescenta, CA (US); Alexander I. Krymski, Montrose, CA (US); Roger A. Panicacci, Los Angeles, CA (US); Christopher Clark, Pasadena, CA (US)

(73) Assignee: Round Rock Research, LLC, Mt. Kisco, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/637,224

(22) Filed: Dec. 14, 2009

(65) Prior Publication Data

US 2010/0134653 A1 Jun. 3, 2010

Related U.S. Application Data

(63) Continuation of application No. 11/121,956, filed on May 5, 2005, now Pat. No. 7,646,407, which is a continuation of application No. 09/298,306, filed on Apr. 23, 1999, now Pat. No. 6,906,745.

(60) Provisional application No. 60/082,793, filed on Apr. 23, 1998.

(51) Int. Cl.  
*H04N 5/235* (2006.01)  
*H04N 5/335* (2011.01)  
(52) U.S. Cl. ............... 348/229.1; 348/362; 348/297  
(58) Field of Classification Search .......... 348/229.1, 348/362, 221.1, 297; 358/443, 482  
See application file for complete search history.

(56) References Cited

U.S. PATENT DOCUMENTS

| | | | |
|---|---|---|---|
| 4,684,995 A * | 8/1987 | Baumeister | 348/364 |
| 4,686,648 A | 8/1987 | Fossum | |
| 4,744,623 A | 5/1988 | Prucnal et al. | |
| 4,776,925 A | 10/1988 | Fossum et al. | |
| 4,920,069 A | 4/1990 | Fossum et al. | |
| 5,055,900 A | 10/1991 | Fossum et al. | |
| 5,079,622 A | 1/1992 | Toshinobu | |
| 5,080,214 A | 1/1992 | Fossum | |
| 5,194,960 A | 3/1993 | Ota | |
| 5,236,871 A | 8/1993 | Fossum et al. | |
| 5,386,128 A | 1/1995 | Fossum et al. | |
| 5,471,515 A | 11/1995 | Fossum et al. | |
| 5,504,524 A | 4/1996 | Lu et al. | |
| 5,512,950 A | 4/1996 | Watanabe et al. | |
| 5,548,773 A | 8/1996 | Kemeny et al. | |
| 5,638,123 A * | 6/1997 | Yamaguchi | 348/362 |
| 5,665,959 A | 9/1997 | Fossum et al. | |
| 5,710,954 A | 1/1998 | Inoue | |
| 5,734,426 A * | 3/1998 | Dong | 348/297 |
| 5,793,322 A | 8/1998 | Fossum et al. | |
| 5,822,222 A * | 10/1998 | Kaplinsky et al. | 250/316.1 |
| 5,841,126 A | 11/1998 | Fossum et al. | |
| 5,880,691 A | 3/1999 | Fossum et al. | |

(Continued)

*Primary Examiner* — Nhan T Tran  
(74) *Attorney, Agent, or Firm* — Lerner, David, Littenberg, Krumholz & Mentlik, LLP

(57) ABSTRACT

Automatic exposure adjusting device considers the image on a pixel-by-pixel basis. Each pixel is characterized according to its most significant bits. After the pixels are characterized, the number of pixels in any particular group is counted. That counting is compared with thresholds which set whether the image is over exposed, under exposed, and can optionally also determine if the image is seriously over exposed or seriously under exposed. Adjustment of the exposure is carried out to bring the image to a more desired state.

36 Claims, 6 Drawing Sheets

U.S. PATENT DOCUMENTS

| | | | |
|---|---|---|---|
| 5,886,659 A | 3/1999 | Pain et al. | |
| 5,887,049 A | 3/1999 | Fossum | |
| 5,909,026 A | 6/1999 | Zhou et al. | |
| 5,920,274 A | 7/1999 | Gowda et al. | |
| 5,949,483 A | 9/1999 | Fossum et al. | |
| 5,952,645 A | 9/1999 | Wang et al. | |
| 5,990,506 A | 11/1999 | Fossum et al. | |
| 5,995,163 A | 11/1999 | Fossum | |
| 6,005,619 A | 12/1999 | Fossum | |
| 6,008,486 A | 12/1999 | Stam et al. | |
| 6,021,172 A | 2/2000 | Fossum et al. | |
| 6,040,860 A | 3/2000 | Tamura et al. | |
| 6,057,539 A | 5/2000 | Zhou et al. | |
| 6,061,091 A * | 5/2000 | Van de Poel et al. | 348/241 |
| 6,124,891 A | 9/2000 | Homma et al. | |
| 6,141,047 A | 10/2000 | Kawai et al. | |
| 6,282,462 B1 | 8/2001 | Hopkins | |
| 6,486,503 B1 | 11/2002 | Fossum | |
| 6,816,200 B1 * | 11/2004 | Gough | 348/362 |

* cited by examiner

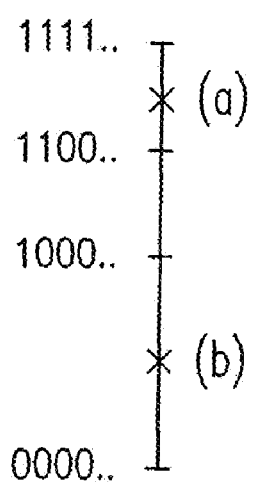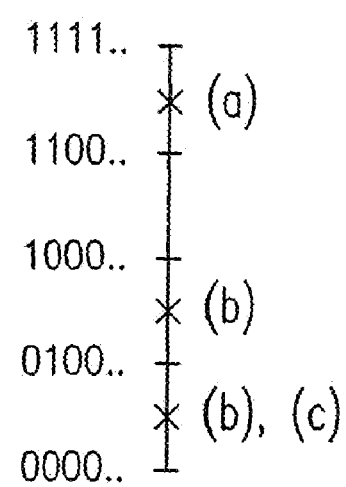
*FIG. 3*  *FIG. 5*

DIGITAL EXPOSURE CIRCUIT FOR AN IMAGE SENSOR

This application is a continuation of U.S. application Ser. No. 11/121,956, filed May 5, 2005 now U.S. Pat. No. 7,646,407, which is a continuation of U.S. application Ser. No. 09/298,306, filed Apr. 23. 1999 and issued as U.S. Pat. No. 6,906,745, which claims the benefit of the U.S. Provisional Application No. 60/082,793, filed on Apr. 23, 1998, the entire disclosures of which are incorporated herein by reference.

BACKGROUND OF THE INVENTION

CMOS active pixel sensors represent a digital solution to obtaining an image of an impinging scene. CMOS technology enables integrating electronics associated with the image sensing onto the chip. This includes, for example, one or more analog-to-digital converters on the chip, as well as timing and control circuitry.

One important feature of a well-defined image is an amount of exposure. Some cameras include automatic gain and exposure control. The automatic gain and exposure control determines if the image is underexposed or overexposed, and can adjust some feature of the image acquisition to correct the exposure amount.

Existing CCD cameras select the exposure time based on some feature of the scene being imaged. Some cameras, for example, compute the average intensity over the entire pixel array. Other cameras compute the average intensity over a central area of the CCD. The average is often calculated by a digital signal processor which is separate from the CCD chip.

SUMMARY OF THE INVENTION

The present system teaches a programmable threshold indicator based on accumulated and programmable measurements of image pieces. The digital image data stream is analyzed by the counting the number of samples within a given interval of intensities to form information indicating an image histogram. The sample count is compared with programmable thresholds.

BRIEF DESCRIPTION OF THE DRAWING

FIG. 3 shows a point diagram of the FIG. 2 embodiment;
FIG. 5 shows a point chart.

DESCRIPTION OF THE PREFERRED EMBODIMENTS

The inventors recognize that in some particular images, exposure control by simply computing the average of the image could produce disadvantageous results. For example, consider a scene of black and white stripes. Fifty percent of the image could be very bright, and the other fifty percent could be completely dark. The average is fifty percent which could be considered the correct exposure. Both image portions from the bright scene and the dark scene, however, could be poor.

Figure 1:
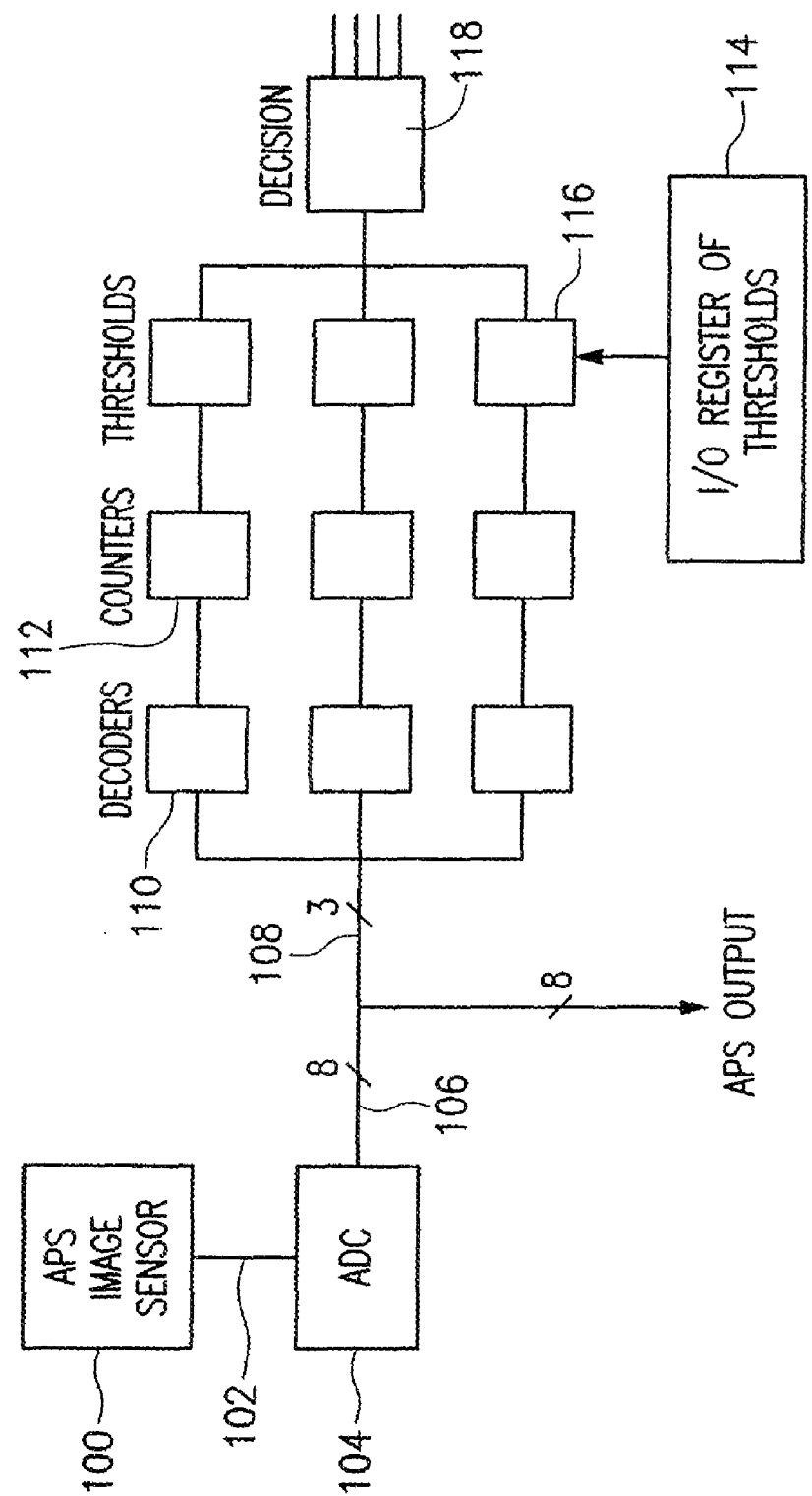
FIG. 1 shows a basic block diagram.

The present system provides a programmable threshold indicator based on measurements of various portions of the image. A block diagram of the system is shown in FIG. 1.

Active pixel image sensor 100 includes an array of units, e.g., rows and columns, of CMOS active pixels. Each preferably includes an in-pixel buffer transistor configured as a source follower, and an in-pixel row or column select transistor. The output of the sensor can be provided either single pixel at a time, or as a parallel group of pixel units 102 to the analog-to-digital converter 104. ADC 104 preferably produces an 8-bit output 106. The two to three most-significant bits of the analog-to-digital converter are usually enough to analyze intensity distribution.

The three most-significant bits 108 are coupled to pixel characterization elements 110. These detect whether the states of the three bit output 108 have a specified characteristics. When the states have the specified characteristics, the decoder produces an output. Counters 112 count the output, effectively counting the number of times that the bits are coincident with the values. Therefore, the counters 112 keep a count, for each frame, of the number of samples which have specified values.

A number of thresholds are maintained by I/O register 114. Comparing elements 116 compare the counter outputs with the thresholds from the interface register. If one or more of these thresholds are exceeded, then decision block 118 produces a command to either increment or decrement the exposure: e.g., the shutter width or gain of image acquisition. This can be done frame by frame, or for a group of frames.

A first embodiment uses a two-threshold simple-scheme. This takes into account only the two most-significant bits. In this scheme, the relative number of data whose MsBs are "11" are counted. The number of data in the lower half segment of the data scale (e.g. the most significant bit [MSB] is equal to 0) is also counted. The data "11" is considered as being close to saturation. An exemplary threshold for the amount of that data can be thirty percent. Similarly, the tolerance for "dark" data, in which the MSB is zero, is restricted to be 75%. Step 202 detects if the first threshold in which both major bits are "11" for more than thirty percent of the data. This is taken as an overexposed condition at 204 and the integration time or gain is lowered. The second threshold is investigated at 210. If five percent of the data is dark (MSB is 0), the data is taken as underexposed data and the integration time or gain is increased.

The thresholds must be selected with an amount of hysteresis which is effective to avoid oscillations when the image has many contrasts i.e. between black and white. For example, the sum of the two percentages should exceed 100 percent.

FIG. 3 shows a bar graph with the overexposure/underexposure parameters. The point A in FIG. 3 is at an overexposed position. If more than 30 percent of the image is in this position, then the image is taken to be overexposed and the gain or integration time is lowered. Conversely, point B is in an, underexposed position. If more than 75 percent of the image is in this position, then the image is taken to be underexposed.

Figure 2:
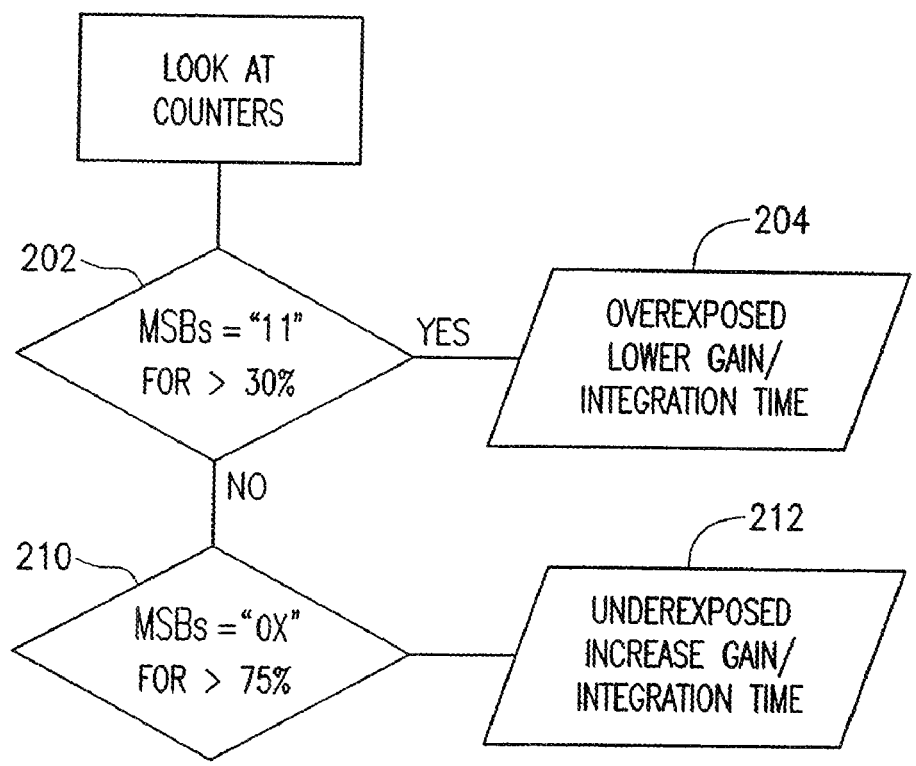
FIG. 2 shows a flowchart of operation of a two-threshold embodiment.
Figure 4:
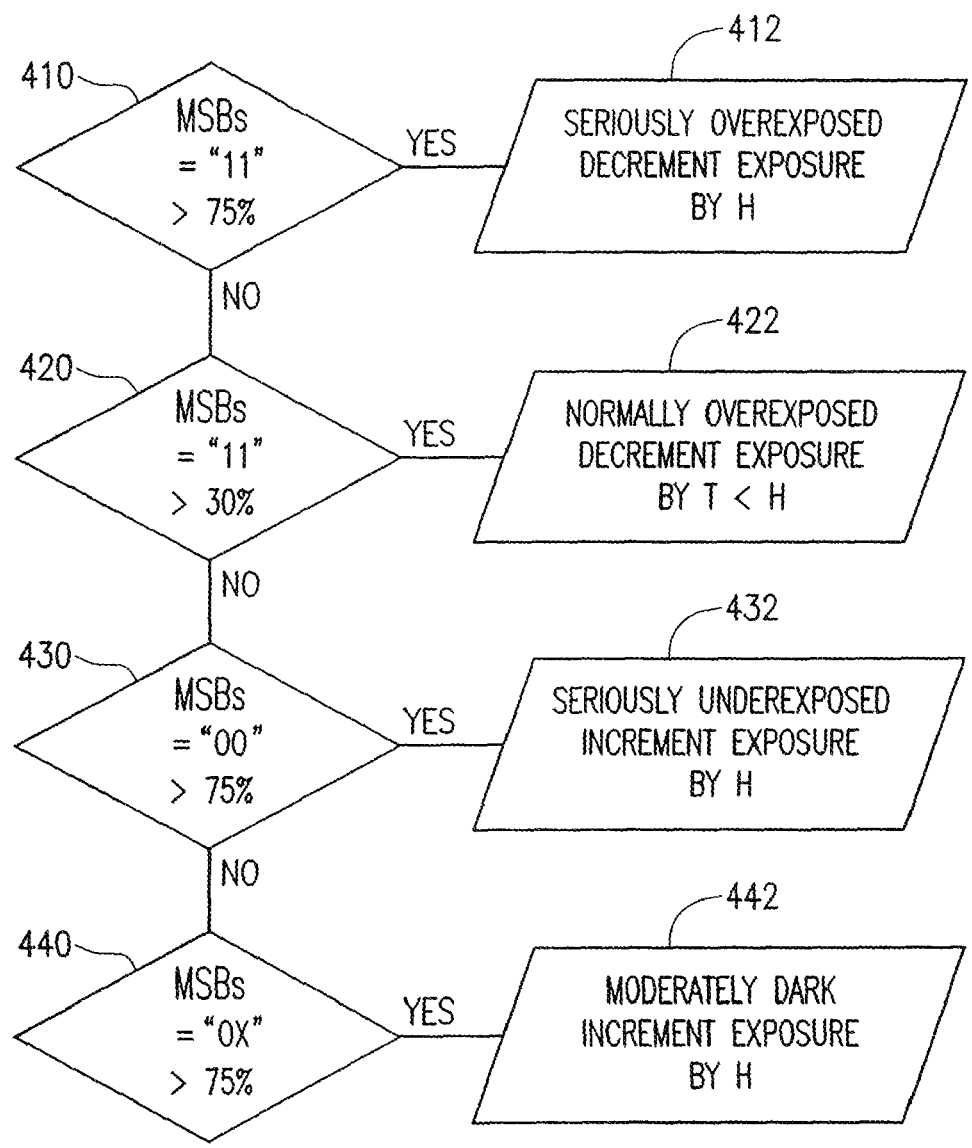
FIG. 4 shows a flowchart of a second, three-threshold embodiment.

A second embodiment which operates according to the flowchart of FIG. 4 uses a three threshold advance scheme. This takes only the two highest bits at the input to the indicator, as in the first system. However, this scheme uses three decoders and three counters as shown in FIG. 1. This system counts: (a) the number of samples in which the upper bits are "11"; (b) the number of samples in which the most significant bit is "0"; and (c) the number of samples in which the upper bits are both "00". This provides more information about the image than the FIG. 2 system. This also enables adjusting the exposure/gain in two steps.

FIG. 4 shows a flowchart of the second embodiment. At step 410, the decision making process determines if the relative number of samples determined by a, in which both MsBs are "11" is more than 75 percent. If so, then the image is considered to be grossly overexposed. At step 406, the exposure/gain is decremented by a higher value H.

If the result of step 410 is No, step 420 tests if the relative number of samples is more than 30 percent. If so, the image is considered as being normally overexposed at 422. A tuning decrement T is applied at step 422 where T less than H.

If the relative number of sample c, the very dark pixels, is more than 75 percent at step 430, then the image is considered as seriously underexposed. In this case, the exposure/gain is incremented by the higher value H at step 432.

Finally, if none of the other steps are true, the relative number of samples b, that is moderately dark pixels that are not very dark, are tested at 440. If this value is more than 75 percent detected at step 416, then the image is considered as moderately dark at 442. A tuning increment T is added to the exposure or gain.

This can be carried out on a frame by frame basis. These thresholds can also be programmable, to allow more bright or dark scenes. The programmable thresholds can be made by user manual intervention, or by an automatic intervention from the computer system.

FIG. 5 shows a bar chart showing the placement of the pixels within groups a, b, or c, similar to that in FIG. 3.

Figure 6:
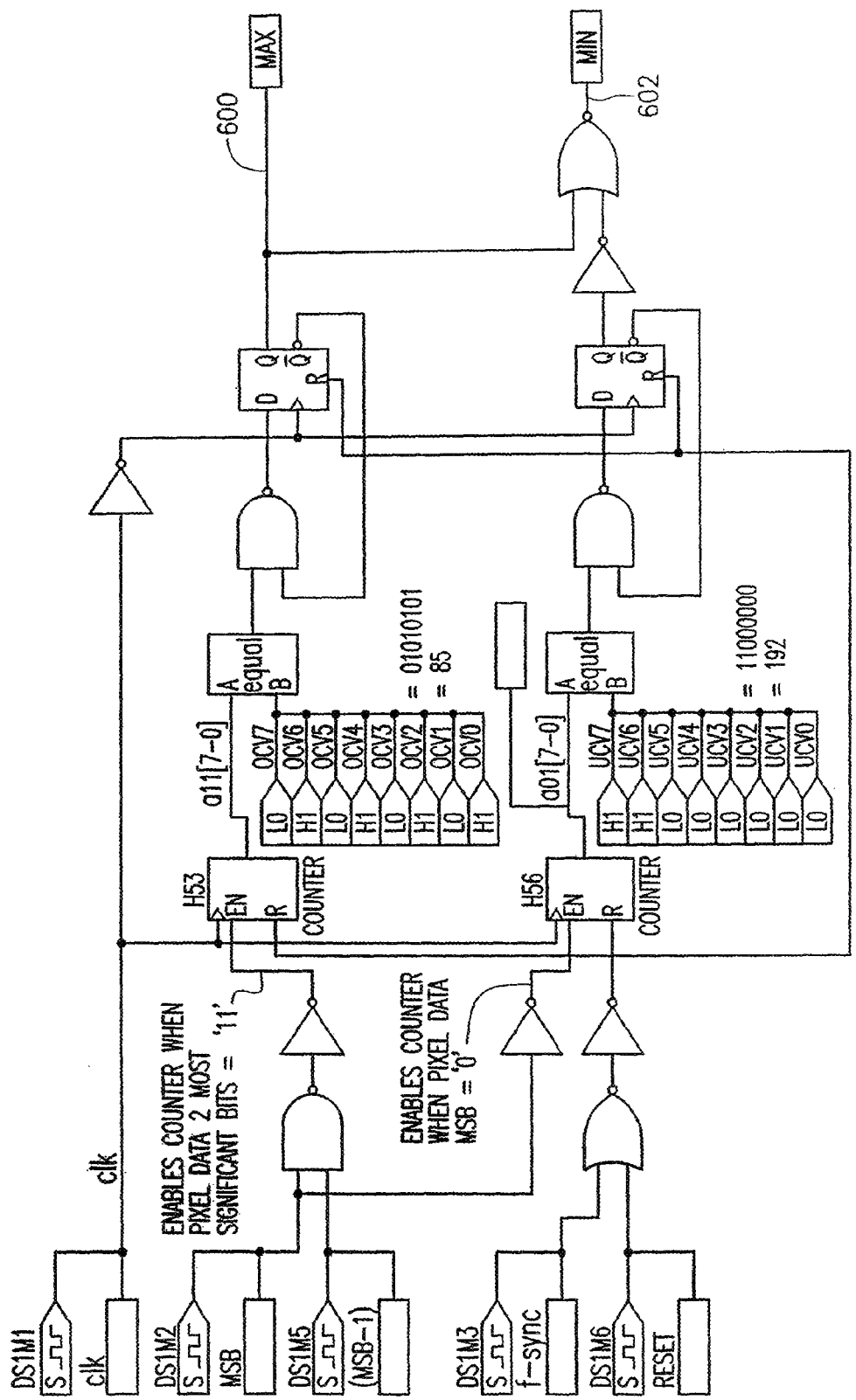
FIG. 6 shows exemplary circuitry for carrying out this embodiment.

An example circuitry is shown in FIG. 6. It should be understood that this circuitry is exemplary only, and that other similar circuits could be easily formed using either a processor or hard wire gates using hardware definition language. Of course, this operation could also be carried out using a programmed processor.

Figure 7:
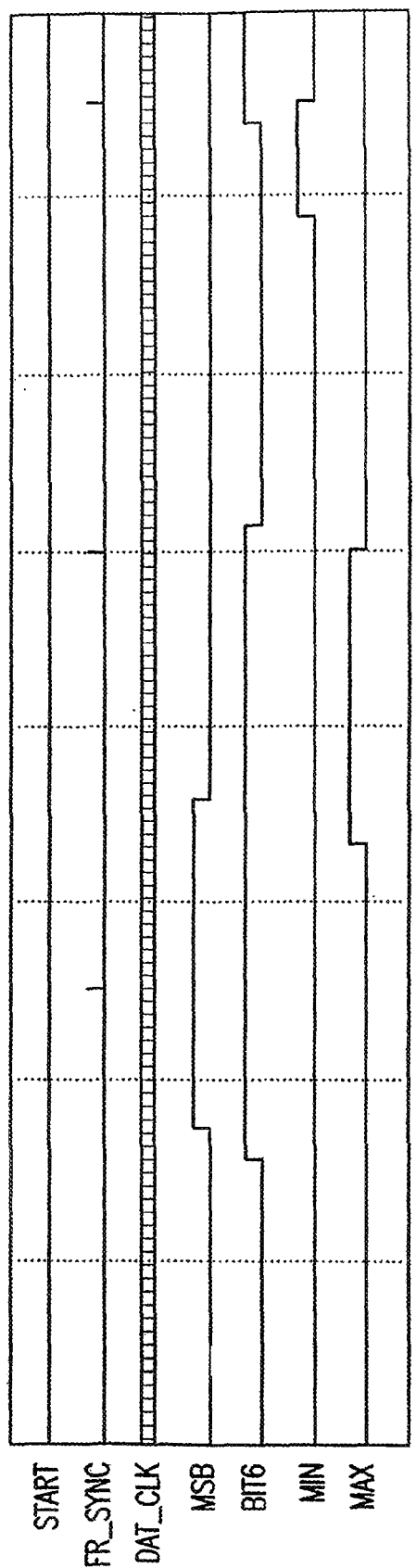
FIG. 7 shows results of simulation.

FIG. 7 shows results of a simulation using a simple test. The circuit signals maxed during the second frame as the number of 11 sample has exceeded 30 percent and min in the third frame as after two 00 counts has approached 75 percent of the total samples.

Although only a few embodiments have been disclosed above, other modifications are within the disclosed features. For example, the system as described could be carried out using a processor or a digital signal processor. Preferably, however, all of the subjects in FIG. 1 are carried out on the same substrate.

What is claimed is:

1. A device comprising:
   an analog to digital converter for producing a plurality of digital outputs comprising a plurality of bits, each of said digital outputs indicative of an output of at least one pixel of an image sensor;
   a first counter which counts a number of said digital outputs indicating overexposure during an image frame;
   a second counter which counts a number of said digital outputs indicating underexposure during said image frame;
   at least one threshold detector for comparing counting results of said first and second counters with desired thresholds; and
   a decision element for making a decision to either increase, decrease, or maintain an exposure of a next frame of said image sensor based on comparison results from the at least one threshold detector.

2. A device as in claim 1, wherein said at least one threshold detector is configured to compare said counting results on a frame by frame basis.

3. A device as in claim 1, wherein said at least one threshold detector is configured to compare said counting results for a group of frames.

4. A device as in claim 1, further comprising first and second characterization elements configured to review only a predetermined number of most significant bits of each of said plurality of digital outputs and provide a signal to a respective one of said first and second counters according to said most significant bits.

5. A device as in claim 1, wherein said first counter counts a number of digital outputs having most significant bits including a plurality of ones, and said second counter counts a number of digital outputs having most significant bits including at least one zero.

6. A device as in claim 5, wherein said second counter counts a number of digital outputs having most significant bits including a plurality of zeros.

7. A device as in claim 6, wherein said number of most significant bits is two.

8. A device as in claim 1, wherein said desired thresholds include a first value indicative of what percentage of said plurality of digital outputs can indicate overexposure and a second value indicative of what percentage of said plurality of digital outputs can indicate underexposure, and
   wherein said decision element is configured to decrease said exposure of said next frame if said number counted by said first counter exceeds said first threshold, and to increase said exposure of said next frame if said number counted by said second counter exceeds said second threshold.

9. A device as in claim 1, further comprising a third counter which counts a number of seriously underexposed pixels, wherein said at least one threshold detector further compares counting results of said third counter with said desired thresholds.

10. A device as in claim 9, wherein said first counter counts a number of said digital outputs having most significant bits including a plurality of ones, said second counter counts a number of said digital outputs having a most significant bit of zero, and said third counter counts a number of said digital outputs having most significant bits including a plurality of zeros.

11. A device as in claim 9, wherein said desired thresholds including a first value indicative of what percentage of said plurality of digital outputs, when counted by said first counter, indicate serious overexposure, a second value indicative of what percentage of said plurality of digital outputs, when counted by said first counter, indicate moderate overexposure, a third value indicative of what percentage of said plurality of digital outputs, when counted by said third counter, indicate serious underexposure, and a fourth value indicative of what percentage of said plurality of digital outputs, when counted by said second counter, indicate moderate underexposure.

12. A device as in claim 11, wherein said decision element is configured to:
   decrease said exposure of said image sensor by a first amount if said count of said first counter exceeds said first value;
   decrease said exposure of said image sensor by a second amount if said count of said first counter exceeds said second value;

increase said exposure of said image sensor by a third amount if said count of said third counter exceeds said third value; and increase said exposure of said image sensor by a fourth amount if said count of said second counter exceeds said fourth value.

13. A device as in claim 1, wherein said decision element is configured to increase or decrease said exposure by adjusting at least one of:

a shutter width of said image sensor; and
a gain of said image sensor.

14. A method of controlling exposure comprising:

obtaining from a current frame a plurality of digital values representing values of pixels of an image sensor;

reviewing only most significant bits of each of said digital values from the current frame to determine if each digital value indicates an overexposed pixel or an underexposed pixel;

comparing results of said determination with desired thresholds; and adjusting exposure of a next frame of said image sensor by:
decreasing said exposure if a number of overexposed pixels is greater than or equal to a first threshold; and
increasing said exposure if a number of underexposed pixels is greater than or equal to a second threshold.

15. A method as in claim 14, further comprising comparing said results of said determination on a frame-by-frame basis.

16. A method as in claim 14, further comprising comparing said results of said determination for a group of frames.

17. A method as in claim 14, wherein said step of reviewing further comprises determining that a digital value indicates:

an overexposed pixel if said most significant bits of said digital value are "11"; and an underexposed pixel if a most significant bit of said digital value is "0".

18. A method as in claim 14, said step of reviewing further comprising reviewing to determine if each digital value indicates a seriously underexposed pixel.

19. A method as in claim 18, said step of adjusting said exposure of said next frame further comprising:

if said number of overexposed pixels is greater than or equal to a third threshold, decreasing said exposure of said image sensor by a greater amount than if said number of overexposed pixels is greater than or equal to said first threshold but less than said third threshold; and if a number of seriously underexposed pixels is greater than or equal to a fourth threshold, increasing said exposure of said image sensor by a greater amount than it said number of underexposed pixels is greater than or equal to a second threshold but said number of seriously underexposed pixels is less than said fourth threshold.

20. A method as in claim 19, said step of reviewing further comprising determining that a digital value indicates:

an overexposed pixel if said most significant bits are "11";
an underexposed pixel if a most significant bit is "0"; and
a seriously underexposed pixel if said most significant bits are "00".

21. A method as in claim 14, said step of adjusting said exposure comprising adjusting at least one of:

a shutter width of said image sensor; and
a gain of said image sensor.

22. A device comprising:

an analog to digital converter for producing a plurality of digital outputs, each of said digital outputs indicative of an output of at least one pixel of an image sensor;

a first counter which counts a number of said digital outputs indicating overexposure during at least one image frame;

a second counter which counts a number of said digital outputs indicating underexposure during said at least one image frame;

at least one comparator for comparing counting results of said first and second counters; and a decision element for making a decision to either increase, decrease, or maintain an exposure of a next frame of said image sensor based on factors including comparison results from the at least one comparator.

23. The device of claim 22, wherein each of said digital outputs comprises a plurality of bits, and wherein said first and second counters count said digital outputs indicating overexposure and said digital outputs indicating underexposure according to a predetermined number of most significant bits of each of said plurality of digital outputs.

24. The device of claim 22, wherein said decision element makes a decision to either increase, decrease, or maintain an exposure of a next frame of said image sensor.

25. The device of claim 22, wherein said comparator compares a count of said digital outputs indicating overexposure and a count of said digital outputs indicating underexposure.

26. The device of claim 22, wherein said comparator compares a percentage of said digital outputs indicating overexposure and a percentage of said digital outputs indicating underexposure.

27. The device of claim 22, wherein said comparator compares counting results of said first and second counters for a plurality of frames.

28. A method of controlling exposure comprising:

obtaining a plurality of digital values from a current frame representing values of pixels of an image sensor;

reviewing each of said digital values to determine if each digital value indicates an overexposed pixel or an underexposed pixel;

comparing a number of digital values determined to indicate overexposed pixels and a number of digital values determined to indicate underexposed pixels in said determination with desired thresholds; and adjusting exposure of a next frame of said image sensor according to factors including said comparison.

29. The method of claim 28, wherein each of said digital outputs comprises a plurality of bits, said step of reviewing each of said digital values further comprising reviewing only a predetermined number of most significant bits of each of said plurality of digital outputs.

30. The method of claim 28, wherein said step of adjusting exposure of a subsequent frame includes adjusting exposure, of a next frame of said image sensor.

31. The method of claim 28, wherein said step of comparing includes comparing a count of digital values determined to indicate overexposed pixels with a count of digital values determined to indicate underexposed pixels.

32. The method of claim 31, further comprising accumulating said count of digital values determined to indicate overexposed pixels and said count of digital values determined to indicate underexposed pixels over a plurality of frames.

33. The method of claim 28, wherein said step of comparing includes comparing a percentage of digital values determined to indicate overexposed pixels with a percentage of digital values determined to indicate underexposed pixels.

34. The method of claim 33, further comprising accumulating said percentage of digital values determined to indicate overexposed pixels and said percentage of digital values determined to indicate underexposed pixels over a plurality of frames.

35. A device comprising:

an analog to digital converter for producing a plurality of digital outputs comprising a plurality of bits, each of said digital outputs indicative of an output of at least one pixel of an image sensor;

a first counter which counts a number of said digital outputs indicating overexposure during an image frame;

a second counter which counts a number of said digital outputs indicating underexposure during said image frame;

a third counter which counts a number of seriously underexposed pixels, wherein said at least one threshold detector further compares counting results of said third counter with desired thresholds;

at least one threshold detector for comparing counting results of said first and second counters with said desired thresholds; and a decision element for making a decision to either increase, decrease, or maintain an exposure of a next frame of said image sensor based on comparison results from the at least one threshold detector wherein said desired thresholds including a first value indicative of what percentage of said plurality of digital outputs, when counted by said first counter, indicate serious overexposure, a second value indicative of what percentage of said plurality of digital outputs, when counted by said first counter, indicate moderate overexposure, a third value indicative of what percentage of said plurality of digital outputs, when counted by said third counter, indicate serious underexposure, and a fourth value indicative of what percentage of said plurality of digital outputs, when counted by said second counter, indicate moderate underexposure.

36. A device as in claim 35, wherein said decision element is configured to:

decrease said exposure of said image sensor by a first amount if said count of said first counter exceeds said first value;

decrease said exposure of said image sensor by a second amount if said count of said first counter exceeds said second value;

increase said exposure of said image sensor by a third amount if said count of said third counter exceeds said third value; and increase said exposure of said image sensor by a fourth amount if said count of said second counter exceeds said fourth value.

* * * * *